United States Patent
Kudamatsu

(10) Patent No.: US 11,440,228 B2
(45) Date of Patent: Sep. 13, 2022

(54) TEMPERATURE CONTROL DEVICE

(71) Applicant: MATSUI MFG. CO., LTD., Osaka (JP)

(72) Inventor: Jun Kudamatsu, Hirakata (JP)

(73) Assignee: MATSUI MFG. CO., LTD., Osaka (JP)

( * ) Notice: Subject to any disclaimer, the term of this patent is extended or adjusted under 35 U.S.C. 154(b) by 317 days.

(21) Appl. No.: 16/565,904

(22) Filed: Sep. 10, 2019

(65) Prior Publication Data
US 2020/0086544 A1 Mar. 19, 2020

(30) Foreign Application Priority Data
Sep. 19, 2018 (JP) .............................. JP2018-175291

(51) Int. Cl.
| B29C 45/73 | (2006.01) |
| B29C 45/03 | (2006.01) |
| B29C 45/78 | (2006.01) |
| B29C 35/00 | (2006.01) |

(52) U.S. Cl.
CPC ........ *B29C 45/7306* (2013.01); *B29C 35/007* (2013.01); *B29C 45/03* (2013.01); *B29C 45/73* (2013.01); *B29C 45/78* (2013.01); *B29C 2945/76498* (2013.01); *B29C 2945/76531* (2013.01); *B29C 2945/76732* (2013.01); *B29C 2945/76735* (2013.01); *B29C 2945/76782* (2013.01); *B29K 2905/00* (2013.01)

(58) Field of Classification Search
None
See application file for complete search history.

(56) References Cited

U.S. PATENT DOCUMENTS

| 9,168,682 | B2 * | 10/2015 | Yamashita | ............ B29C 35/002 |
| 2015/0370262 | A1 * | 12/2015 | Hanaoka | ................ F04D 13/06 |
| | | | | 137/557 |
| 2016/0250685 | A1 * | 9/2016 | Shimizu | ................ B29C 35/007 |
| | | | | 164/128 |

FOREIGN PATENT DOCUMENTS

| CN | 102004506 A | 4/2011 |
| JP | H6-210636 A | 8/1994 |
| JP | 2003-145599 A | 5/2003 |

(Continued)

OTHER PUBLICATIONS

Notice of Reasons for Refusal for Japanese Application No. 2018-175291 dated Jun. 7, 2022, with machine translation, 8 pages.

*Primary Examiner* — Benjamin A Schiffman
(74) *Attorney, Agent, or Firm* — Bret E. Field; Bozicevic, Field & Francis LLP

(57) ABSTRACT

A temperature control device is provided that is capable of making the temperature of a metallic mold speedily reach a target temperature.
The temperature control device is provided with: a first medium circulating portion that circulates a medium via a first pipeline; a second medium circulating portion that circulates the medium via a second pipeline; a third medium circulating portion that circulates the medium via a third pipeline; a switching portion that switches the medium circulated through an object by selecting any one of the first pipeline, the second pipeline and the third pipeline; and a pressure supply portion that supplies a required pressure through a pressure pipe communicating with each of the first pipeline, the second pipeline and the third pipeline.

6 Claims, 13 Drawing Sheets

(56) References Cited

FOREIGN PATENT DOCUMENTS

| JP | 2006001130 | A | * | 1/2006 | |
|----|------------|---|---|--------|---|
| JP | 2009234007 | A | * | 10/2009 | |
| JP | 2010-89293 | A |   | 4/2010 | |
| JP | 2010110989 | A | * | 5/2010 | ......... B29C 33/0083 |
| JP | 2012045872 | A | * | 3/2012 | |
| JP | 2012081595 | A | * | 4/2012 | ........... B29C 35/007 |
| JP | 2012121245 | A | * | 6/2012 | ......... B29C 45/7306 |
| JP | 2014000786 | A | * | 1/2014 | |
| JP | 2016030393 | A | * | 3/2016 | ........... B29C 35/007 |
| JP | 2017087440 | A | * | 5/2017 | ........... B29C 33/0083 |
| JP | 2017087441 | A | * | 5/2017 | |
| JP | 2017094489 | A | * | 6/2017 | ......... B29C 45/7306 |

* cited by examiner

TEMPERATURE CONTROL DEVICE

CROSS-REFERENCE TO RELATED APPLICATIONS

This non-provisional application claims priority under 35 U.S.C. § 119(a) on Patent Application No. 2018-175291 filed in Japan on Sep. 19, 2018, the entire contents of which are hereby incorporated by reference.

FIELD

The present disclosure relates to a temperature control device.

BACKGROUND

For an injection molding machine that performs injection molding of molded items by using a synthetic resin such as plastic, a metallic mold is used. The metallic mold for injection molding has: a cavity which is a spatial portion in which molten plastic is filled; and a flow channel where a medium flows that controls the metallic mold temperature for solidifying molten plastic. In order to increase the accuracy of the molded items, a metallic mold temperature adjustment device is used that accurately adjusts the temperature of the metallic mold to a required temperature through the medium.

Japanese Patent Application Laid-Open No. 2003-145599 discloses a heating-cooling device where cold water and hot water are flown through a medium flow channel provided on the metallic mold by valve switching, hot water is flown at the time of injection process to make the metallic mold high in temperature, a skin layer is formed and foamed and switching is made from hot water to cold water, thereby reducing the molding cycle of attaining solidified state.

SUMMARY

However, in the device of Japanese Patent Application Laid-Open No. 2003-145599, although a rapid temperature drop of the hot water and temperature rise of the cold water are suppressed at the time of switching and switching can be made smoothly since hot water and cold water are alternately fed into a water storage tank for a while at the time of switching between the hot water and the cold water, the temperature of the metallic mold cannot be set to a target value, so that the device settles for medium temperature control.

For this reason, it is desired for the metallic mold temperature to speedily reach a set temperature (target temperature).

The present disclosure is made in view of such circumstances, and an object thereof is to provide a temperature control device capable of making the metallic mold temperature speedily reach a target temperature.

A temperature control device according to the present disclosure is a temperature control device that controls a temperature of a medium circulated through an object via a pipeline and is provided with: a first medium circulating portion that circulates the medium via a first pipeline; a second medium circulating portion that circulates the medium via a second pipeline; a third medium circulating portion that circulates the medium via a third pipeline; a switching portion that switches the medium circulated through the object by selecting any one of the first pipeline, the second pipeline and the third pipeline; and a pressure supply portion that supplies a required pressure through a pressure pipe communicating with each of the first pipeline, the second pipeline and the third pipeline.

According to the present disclosure, the temperature of the metallic mold can be made to speedily reach a target temperature.

The above and further objects and features of the invention will more fully be apparent from the following detailed description with accompanying drawings.

BRIEF DESCRIPTION OF THE DRAWINGS

Hereinafter, the present disclosure will be described based on the drawings showing an embodiment thereof. FIG. 1 is an explanatory view showing an example of the structure of a temperature control device of the present embodiment. The temperature control device is provided with a temperature adjustment unit 100, a valve unit 110, a valve controller 40 and a control portion 50. The temperature control device is a device that rapidly heats and rapidly cools a metallic mold 60 as the object and adjusts the temperature of the metallic mold 60.

Figure 1:
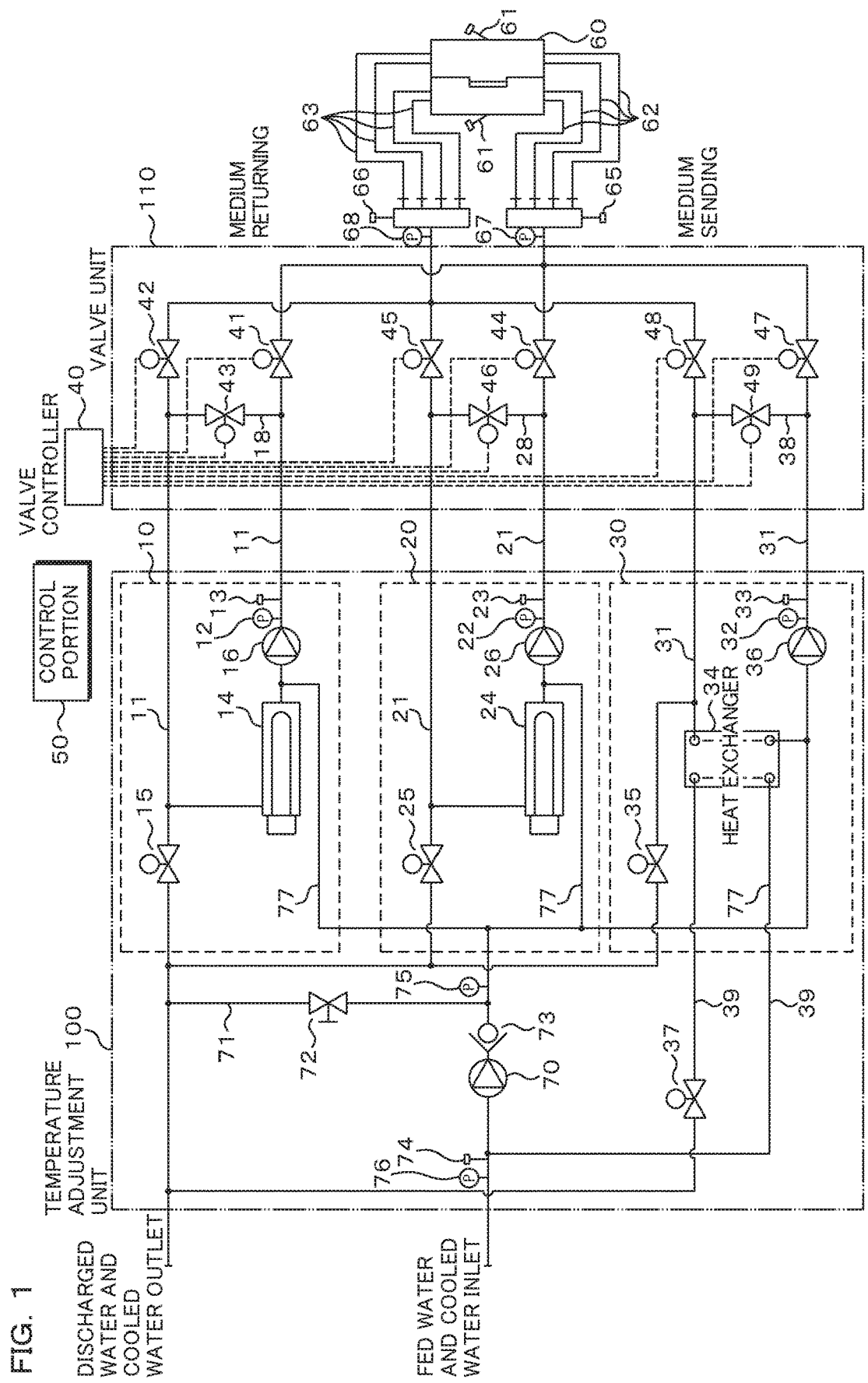
FIG. 1 is an explanatory view showing an example of the structure of a temperature control device of the present embodiment.

The temperature adjustment unit 100 is provided with a temperature adjuster 10 for maintenance as a first medium circulating portion, a temperature adjuster 20 for high temperature as a second medium circulating portion, and a temperature adjuster 30 for cooling as a third medium circulating portion. The temperature adjuster 10 for maintenance circulates a first medium through the metallic mold 60 via a pipeline 11 as a first pipeline. While the temperature of the first medium (first target temperature) may be, for example, 60 degrees C., the temperature is not limited thereto. The temperature adjuster 20 for high temperature circulates a second medium through the metallic mold 60 via a pipeline 21 as a second pipeline. While the temperature of the second medium (second target temperature) is higher than the temperature of the first medium and may be, for example, 160 degrees C., the temperature is not limited thereto. The temperature adjuster 30 for cooling circulates a third medium through the metallic mold 60 via a pipeline 31 as a third pipeline. While the temperature of the third medium is lower than the temperature of the first medium and may be, for example, 40 degrees C., the temperature is not limited thereto. The first medium, the second medium and the third medium do not indicate that the kinds of the media themselves are different but indicate for the sake of convenience' sake that the temperatures of the media are different. The medium is, for example, water, but is not limited to water and may be a different medium such as an oil family or an alcohol family.

The temperature adjuster 10 for maintenance is provided with: a heater 14; a pump 16; a pressure sensor 12 that detects the pressure of the pipeline 11; a temperature sensor 13 as a first medium temperature detection portion that detects the temperature of the first medium; and a feeding and cooling electromagnetic valve 15. The pipeline 11 communicates with a discharged water and cooled water outlet through the feeding and cooling electromagnetic valve 15. The temperature adjuster 10 for maintenance is capable of circulating the medium for maintaining the temperature of the metallic mold 60 in the injection process.

The temperature adjuster 20 for high temperature is provided with: a heater 24; a pump 26; a pressure sensor 22 that detects the pressure of the pipeline 21; a temperature sensor 23 as a second medium temperature detection portion that detects the temperature of the second medium; and a feeding and cooling electromagnetic valve 25. The pipeline 21 communicates with the discharged water and cooled water outlet through the feeding and cooling electromagnetic valve 25. The temperature adjuster 20 for high temperature is capable of circulating the medium for making the temperature of the metallic mold 60 high in order to solidify a resin (for example, a thermoset resin) injected into the metallic mold 60.

The temperature adjuster 30 for cooling is provided with: a heat exchanger 34; a pump 36; a pressure sensor 32 that detects the pressure of the pipeline 31; a temperature sensor 33 as a third medium temperature detection portion that detects the temperature of the third medium; and a feeding electromagnetic valve 35. The pipeline 31 communicates with the discharged water and cooled water outlet through the feeding electromagnetic valve 35. The temperature adjuster 30 for cooling is capable of circulating the medium for speedily cooling the metallic mold 60 that is high in temperature. The primary side of the heat exchanger 34 to which a pipeline 39 is connected communicates with a fed water and cooled water inlet and the discharged water and cooled water outlet. In the middle of the pipeline 39, a cooling electromagnetic valve 37 is provided.

The valve controller 40 and the valve unit 110 have a function as a switching portion. The valve unit 110 is provided with electromagnetic valves 41 to 49. The electromagnetic valve 41 is provided in the middle of the medium sending side of the pipeline 11 (the inlet side of the metallic mold 60). The electromagnetic valve 42 is provided in the middle of the medium returning side of the pipeline 11 (the outlet side of the metallic mold 60). The electromagnetic valve 43 is provided in the middle of a pipeline 18 communicating with the medium sending side and the medium returning side of the pipeline 11. By opening the electromagnetic valves 41 and 42 and closing the electromagnetic valve 43, the temperature adjuster 10 for maintenance circulates the first medium through the metallic mold 60. Moreover, by closing the electromagnetic valves 41 and 42 and opening the electromagnetic valve 43, the supply of the first medium to the metallic mold 60 by the temperature adjuster 10 for maintenance can be stopped.

The electromagnetic valve 44 is provided in the middle of the medium sending side of the pipeline 21. The electromagnetic valve 45 is provided in the middle of the medium returning side of the pipeline 21. The electromagnetic valve 46 is provided in the middle of a pipeline 28 communicating with the medium sending side and the medium returning side of the pipeline 21. By opening the electromagnetic valves 44 and 45 and closing the electromagnetic vale 46, the temperature adjuster 20 for high temperature circulates the second medium through the metallic mold 60. Moreover, by closing the electromagnetic valves 44 and 45 and opening the electromagnetic valve 46, the supply of the second medium to the metallic mold 60 by the temperature adjuster 20 for high temperature can be stopped.

The electromagnetic valve 47 is provided in the middle of the medium sending side of the pipeline 31. The electromagnetic valve 48 is provided in the middle of the medium returning side of the pipeline 31. The electromagnetic valve 49 is provided in the middle of a pipeline 38 communicating with the medium sending side and the medium returning side of the pipeline 31. By opening the electromagnetic valves 47 and 48 and closing the electromagnetic valve 49, the temperature adjuster 30 for cooling circulates the third medium through the metallic mold 60. Moreover, by closing the electromagnetic valves 47 and 48 and opening the electromagnetic valve 49, the supply of the third medium to the metallic mold 60 by the temperature adjuster 30 for cooling can be stopped.

The medium sending side of the pipelines 11, 21 and 31 branches into four channels in the middle, and the branched pipelines 62 are each connected to the inlet side of the metallic mold 60. The branched pipelines 62 are each provided with a medium sending valve (not shown) and capable of adjusting the flow amount of the medium. Likewise, the medium returning side of the pipelines 11, 21 and 31 also branches into four channels of pipelines 63 on the outlet side of the metallic mold 60, and the pipelines 63 are each provided with a medium returning valve (not shown) and capable of adjusting the flow amount of the medium. Moreover, on the medium sending side of the pipelines 11, 21 and 31, a temperature sensor 65 and a pressure sensor 67 are provided, and on the medium returning side of the pipelines 11, 21 and 31, a temperature sensor 66 and a pressure sensor 68 are provided. The metallic mold 60 is provided with temperature sensors 61 as object temperature detection portions.

The valve controller 40 is capable of controlling the opening and closing of the electromagnetic valves 41 to 49 based on the control of the control portion 50.

The valve controller 40 is capable of switching the medium to be circulated through the metallic mold 60 by selecting any one of the pipeline 11, the pipeline 21 and the pipeline 31. For example, a state in which the first medium is circulated by the temperature adjuster 10 for maintenance (metallic mold temperature maintaining state), a state in which the second medium is circulated by the temperature adjuster 20 for high temperature (metallic mold temperature high temperature state), a state in which the third medium is circulated by the temperature adjuster 30 for cooling (metallic mold temperature cooling state), and a state in which the first medium is circulated by the temperature adjuster 10 for maintenance (metallic mold temperature maintaining state) can be repeated in this order.

Thereby, when the temperature of the metallic mold 60 is returned from a high temperature (for example, 160 degrees C.) to a maintenance temperature (60 degrees C.), by temporarily switching from the temperature adjuster 20 for high temperature to the temperature adjuster 30 for cooling, the temperature of the metallic mold 60 can be speedily cooled, so that the temperature of the metallic mold 60 can be made to speedily reach a target temperature (maintenance temperature).

The temperature adjustment unit 100 is provided with a pressurization pump 70 as a pressure supply portion. The pressurization pump 70 may be an inverter-controlled one or may be one not inverter-controlled. By using an inverter-controlled one, contribution to energy saving is made because the discharge pressure is feedback-controlled.

The inlet side of the pressurization pump 70 communicates with the fed water and cooled water inlet, and on the inlet side of the pressurization pump 70, a temperature sensor 74 and a pressure sensor 76 are provided. The outlet side of the pressurization pump 70 is connected to a bypass pipe 71 communicating with the discharged water and cooled water outlet through a check valve 73. In the middle of the bypass pipe 71, an on-off valve 72 is provided. The bypass pipe 71 communicates on the discharged water and cooled water outlet side of the pipelines 11, 21 and 31.

The outlet side of the pressurization pump 70 communicates with a pressure pipe 77 through the check valve 73. The pressure pipe 77 is provided with a pressure sensor 75. The pressure pipe 77 branches into three, and the branched pressure pipes 77 communicate with the pipeline 11 (the pipeline 11 between the heater 14 and the pump 16), the pipeline 21 (the pipeline 21 between the heater 24 and the pump 26) and the pipeline 31 (the pipeline 31 between the heat exchanger 34 and the pump 36), respectively. That is, from one pressurization pump 70, a required pressure can be applied to the pipeline 11, the pipeline 21 and the pipeline 31 through the three pressure pipes 77, respectively.

Thereby, for example, even when the temperature of the medium (for example, water) circulating through any of the pipeline 11, the pipeline 21 and the pipeline 31 increases and the medium boils unless pressurized to a pressure not less than the saturated water vapor pressure of the medium, a required pressure (pressure not less than the saturated water vapor pressure) can be applied to the pipeline 11, the pipeline 21 and the pipeline 31 through the pressure pipe 77 by the pressurization pump 70, so that the medium can be prevented from boiling.

If a pressurization pump is provided on each of the pipeline 11, the pipeline 21 and the pipeline 31, the pressures applied to the pipeline 11, the pipeline 21 and the pipeline 31 are different because of the difference among the pressure settings of the pressurization pumps and the individual difference, so that a pressure difference and pressure fluctuations occur in the pipelines when the medium is switched. For this reason, the medium can instantaneously boil at the time of switching of the medium and there is a possibility that scale adheres to the heater or the pumps break. In the present embodiment, since a required pressure is applied to the pipeline 11, the pipeline 21 and the pipeline 31 through the three pressure pipes 77 from one pressurization pump 70, the pressure can be stabilized without the occurrence of a pressure difference or pressure fluctuations in the pipelines at the time of switching of the medium. Moreover, there is no possibility that the medium instantaneously boils at the time of switching of the medium, the adhesion of scale to the heaters 14 and 24 never occurs, and no breakage of the pumps 16, 26 and 36 occurs.

Figure 2:
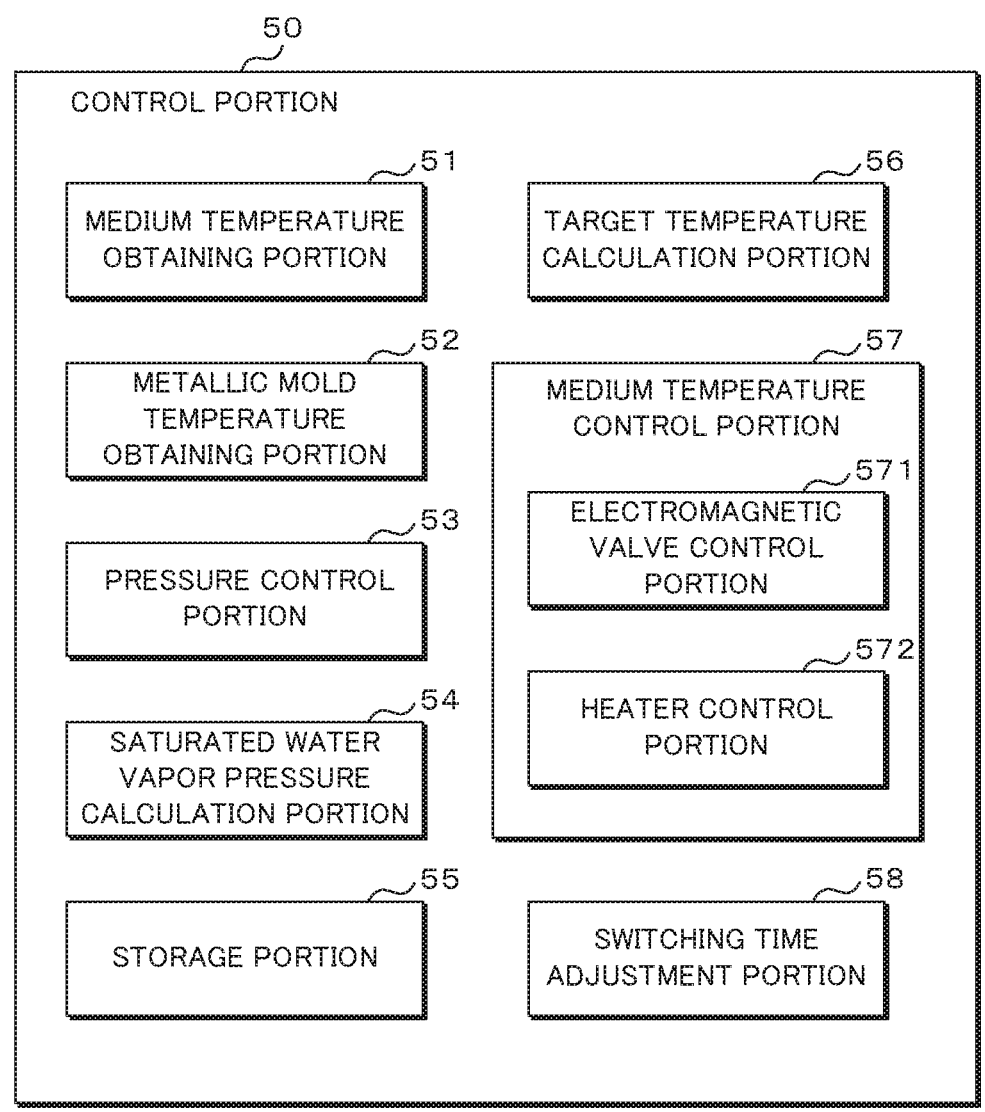
FIG. 2 is a block diagram showing an example of the structure of a control portion.

FIG. 2 is a block diagram showing an example of the structure of the control portion 50. The control portion 50 is provided with a medium temperature obtaining portion 51, a metallic mold temperature obtaining portion 52, a pressure control portion 53, a saturated water vapor pressure calculation portion 54, a storage portion 55, a target temperature calculation portion 56, a medium temperature control portion 57 and a switching time adjustment portion 58. The medium temperature control portion 57 is provided with an electromagnetic valve control portion 571 and a heater control portion 572. The control portion 50 controls the operation of the temperature control device of the present embodiment. Specifically, the control portion 50 controls the opening and closing of the electromagnetic valves 41 to 49 through the valve controller 40 in order to set the temperature of the metallic mold 60 to a desired temperature and to rapidly heat and rapidly cool the metallic mold 60.

Figure 3:
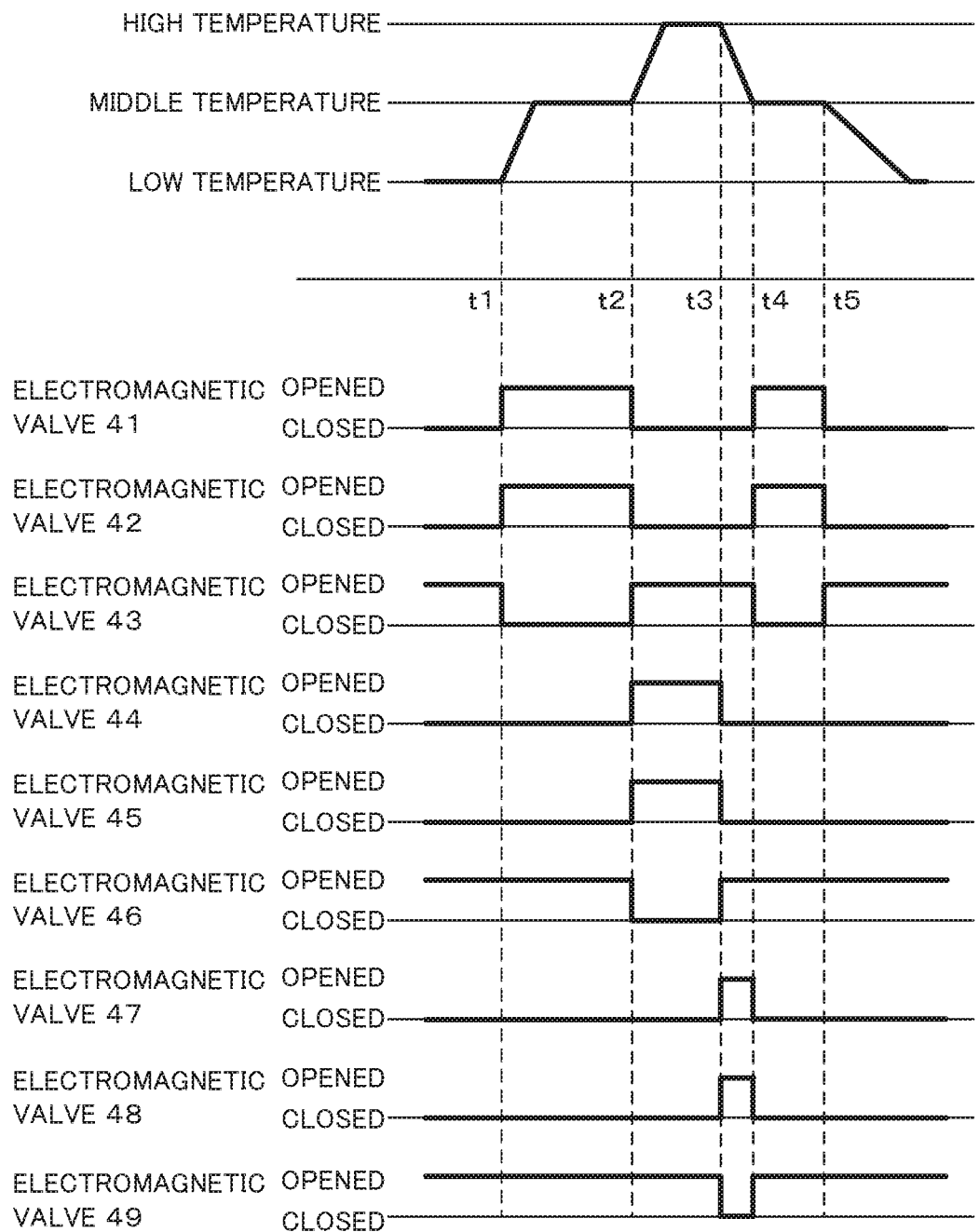
FIG. 3 is a time chart showing an example of the temperature of a metallic mold and the opening and closing control of electromagnetic valves.

FIG. 3 is a time chart showing an example of the temperature of the metallic mold 60 and the opening and closing control of the electromagnetic valves 41 to 49. As shown in the upper part of FIG. 3, the temperature of the metallic mold 60 shifts among three temperatures of a low temperature (for example, room temperature), a middle temperature (maintenance temperature) and a high temperature. At the middle temperature (maintenance temperature, for example, 60 degrees C.) raised from the low temperature, the process of injecting molten resin (for example, liquid resin) is performed, at the high temperature (for example, 160 degrees C.), fixing to fix (thermally harden) the molten resin is performed, and thereafter, the metallic mold 60 is maintained at the maintenance temperature again, the molded item is taken out, and another injection and the like are repeated. In FIG. 3, for the sake of convenience, a condition in which the temperature shifts from the middle temperature to the low temperature is shown.

During the time before time point t1, the electromagnetic valves 41, 42, 44, 45, 47 and 48 are closed and the electromagnetic valves 43, 46 and 49 are opened. Under this condition, for example, the media of the temperature adjuster 10 for maintenance, the temperature adjuster 20 for high temperature and the temperature adjuster 30 for cooling are not circulated through the metallic mold 60 and are maintained at a desired temperature.

At time point t1, the electromagnetic valves 41 and 42 are opened and the electromagnetic valve 43 is closed. Thereby, the temperature adjuster 10 for maintenance circulates the first medium through the metallic mold 60. When the temperature of the metallic mold 60 is maintained at the desired temperature, the injection process can be performed.

At time point t2, when the injection is finished, the electromagnetic valves 41 and 42 are closed and the electromagnetic valve 43 is opened. At the same time, the electromagnetic valves 44 and 45 are opened and the electromagnetic valve 46 is closed. Thereby, switching is made from the temperature adjuster 10 for maintenance and the temperature adjuster 20 for high temperature, and the temperature adjuster 20 for high temperature circulates the second medium through the metallic mold 60. Thereby, the metallic mold 60 is rapidly heated to solidify the resin.

At time point t3, when the resin is solidified, the electromagnetic valves 44 and 45 are closed and the electromagnetic valve 46 is opened. At the same time, the electromagnetic valves 47 and 48 are opened and the electromagnetic valve 49 is closed. Thereby, switching is made from the temperature adjuster 20 for high temperature to the temperature adjuster 30 for cooling, and the temperature adjuster 30 for cooling circulates the third medium through the metallic mold 60. Thereby, the metallic mold 60 is rapidly cooled.

That is, when the temperature of the metallic mold 60 is returned from the high temperature (second temperature) to the maintenance temperature (first temperature), since the temperature of the metallic mold 60 can be speedily cooled by temporarily switching to the temperature adjuster 30 for cooling, the temperature of the metallic mold 60 can be made to speedily reach the target temperature (maintenance temperature).

At time t4, when the temperature of the metallic mold 60 becomes near the maintenance temperature, the electromagnetic valves 41 and 42 are opened and the electromagnetic valve 49 is closed. At the same time, the electromagnetic valves 41 and 42 are opened and the electromagnetic valve 43 is closed. Thereby, switching is made from the temperature adjuster 30 for cooling to the temperature adjuster 10 for maintenance, and the temperature adjuster 10 for maintenance circulates the first medium through the metallic mold 60. Thereby, the temperature of the metallic mold 60 can be maintained at the maintenance temperature. When the injection molding is repeated, similar operations are repeated thereafter.

At time t5, the electromagnetic valves 41 and 42 are closed and the electromagnetic valve 43 is opened. Thereby, the temperature of the metallic mold 60 decreases toward room temperature.

Next, an example will be described in which pressurization is performed in order that the medium does not boil.

Figure 4:
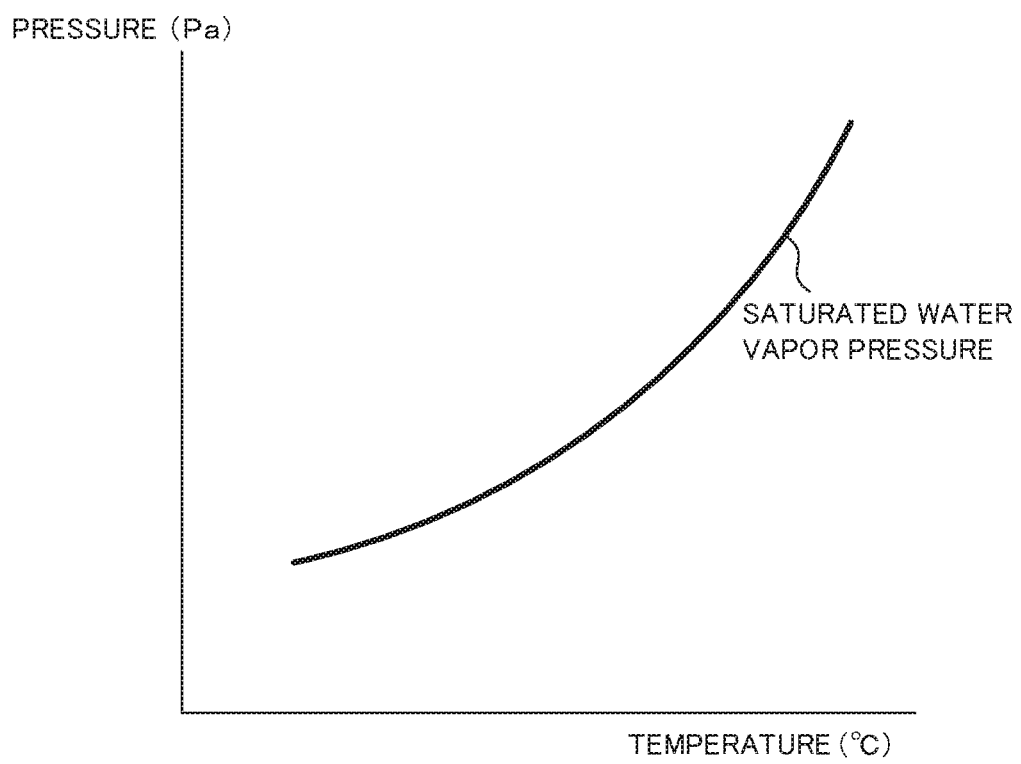
FIG. 4 is a schematic view showing an example of the change of a saturated water vapor pressure of a medium.

FIG. 4 is a schematic view showing an example of the change of the saturated water vapor pressure of the medium. In the figure, the vertical axis represents the pressure (Pa) and the horizontal axis represents the temperature (degrees C.). As shown in FIG. 4, the saturated water vapor pressure of the medium increases as the temperature increases. For example, when the temperature of the medium increases from 100 degrees C. to 160 degrees C., since the saturated water vapor pressure also increases, the medium (liquid) comes to a boil trying to become vapor.

Figure 5:
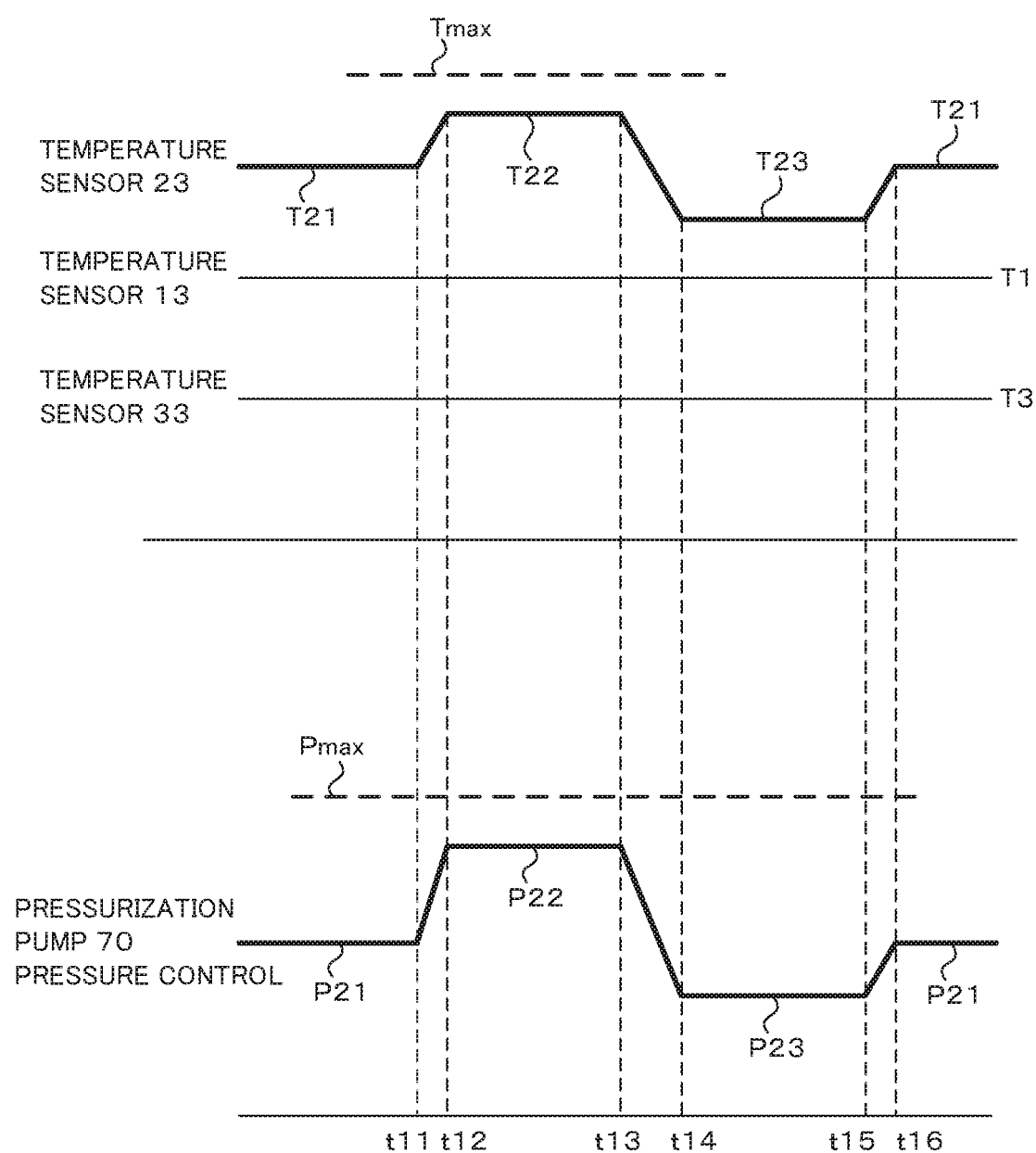
FIG. 5 is a time chart showing an example of the pressure control by a pressure control portion.

FIG. 5 is a time chart showing an example of the pressure control by the pressure control portion 53. The upper part of FIG. 5 shows the shift of the temperature detected by the temperature sensors 13, 23 and 33. The medium temperature obtaining portion 51 obtains the temperature information detected by the temperature sensors 13, 23, 33, 65 and 66. The metallic mold temperature obtaining portion 52 obtains the temperature information detected by the temperature sensors 61. As shown in FIG. 5, the detection temperature of the temperature sensor 13 is constant at T1, and the detection temperature of the temperature sensor 33 is also constant at T3. The detection temperature of the temperature sensor 23 is T21 before time point t11, and shifts in such a manner that it is T22 at time point t12, is T22 during the time between time points t12 and t13, is T23 at time point t14, is T23 during the time between time points T14 and t15 and is T21 at time point 16. Moreover, the highest temperature of the medium is Tmax.

The pressure control portion 53 controls the pressure supplied by the pressurization pump 70. The pressure control portion 53 controls the pressure so as to be not less than the saturated water vapor pressure corresponding to the highest one of the temperatures at which the media circulating through the pipeline 11, the pipeline 21 and the pipeline 31 come to a boil. For example, when the saturated water vapor pressure corresponding to the highest temperature Tmax of the medium is Pmax, the pressure control portion 53 can control the pressure so as to be not less than Pmax. Thereby, whatever the temperatures of the media circulated by the temperature adjuster 10 for maintenance, the temperature adjuster 20 for high temperature and the temperature adjuster 30 for cooling are, the media can be prevented from boiling.

Moreover, the pressure control portion 53 is capable of controlling the pressure so as to be not less than the saturated water vapor pressure corresponding to the highest one of the temperatures of the media detected by the temperature sensors 13, 23 and 33. For example, when the highest one of the temperatures detected by the temperature sensors is T22, the pressure control portion 53 is capable of controlling the pressure so as to be not less than the saturated water vapor pressure P22 corresponding to the temperature T22. Thereby, whatever the temperatures of the media circulated by the temperature adjuster 10 for maintenance, the temperature adjuster 20 for high temperature and the temperature adjuster 30 for cooling are, the media can be prevented from boiling.

The saturated water vapor pressure calculation portion 54 has a function as a calculation portion, and repetitively calculates the highest one of the saturated water vapor pressures of the media based on the temperatures of the media repetitively detected by the temperature sensors 13, 23 and 33. In this case, the saturated water vapor pressure corresponding to the highest one of the temperatures detected by the temperature sensors 13, 23 and 33 may be calculated, or the highest one of the saturated water vapor pressures corresponding to the temperatures detected by the temperature sensors 13, 23 and 33 may be calculated.

The pressure control portion 53 is capable of controlling the pressure so as to be not less than the highest saturated water vapor pressure in response to the shift of the highest saturated water vapor pressure calculated by the saturated water vapor pressure calculation portion 54. As shown in FIG. 5, assuming that the calculated saturated water vapor pressure shifts from P21, P22, P23 to P21 in response to the shift of the temperature of the temperature sensor 23, the pressure control portion 53 is capable of controlling the pressure so as to be not less than the shifted highest saturated water vapor pressure. By changing the highest saturated water vapor pressure according to the temperature of the medium, for example, the applied pressure can be changed according to the highest saturated water vapor pressure without the need to always apply a pressure not less than a preset constant highest saturated water vapor pressure, so that the safety of the device can be enhanced without the need to apply more pressure than is necessary.

Moreover, when the pressures of the pipeline 11, the pipeline 21 and the pipeline 31 are decreased, by opening the on-off valve 72 without stopping the pressurization pump 70, the pressures can be decreased through the bypass pipe 71. Moreover, since water can be circulated, the temperature rise of the pressure pipe 77 can be prevented.

Next, the temperature control method of the metallic mold 60 by the temperature control device of the present embodiment will be described.

Generally, the temperature adjustment of the metallic mold is performed by a method in which not the metallic mold temperature itself is controlled but the medium temperature is controlled so as to be a set temperature and in the result thereof, the temperature of the temperature-controlled metallic mold is made close to a desired temperature. However, because of the response characteristics of the metallic mold to the temperature (for example, the time constant of the temperature is high), when the temperature of the metallic mold is changed, even if the medium temperature is changed, a delay occurs in the temperature change because of the temperature response characteristics of the metallic mold, a large temperature difference occurs between the medium temperature and the metallic mold temperature, and making the temperature of the metallic mold a desired temperature is difficult and requires time. Moreover, if the feedback control of the medium temperature is enhanced in order to complement the temperature response characteristics of the metallic mold, a transitional overshoot or undershoot can occur. Hereinafter, the present embodiment will be described.

The target temperature calculation portion 56 has a function as a medium target temperature calculation portion, and calculates a first medium target temperature of the first medium based on the temperatures of the metallic mold detected by the temperature sensors 61 (detection temperatures) and a first metallic mold target temperature of the metallic mold 60 when the first medium is circulated by the temperature adjuster 10 for maintenance.

The medium temperature control portion 57 controls the temperature of the first medium circulated by the temperature adjuster 10 for maintenance based on the temperature of the first medium detected by the temperature sensor 66 (return medium temperature) and the first medium target temperature.

Figure 6:
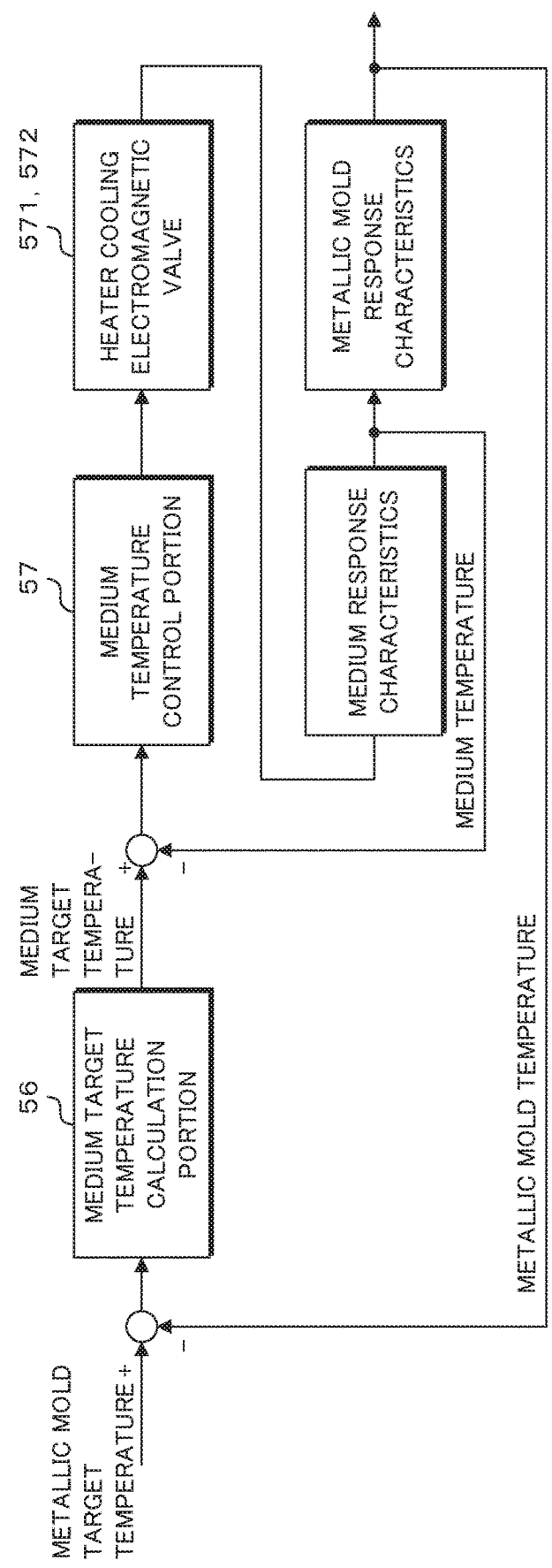
FIG. 6 is a block diagram showing an example of the temperature control of the metallic mold by the control portion of the present embodiment.

FIG. 6 is a block diagram showing an example of the temperature control of the metallic mold 60 by the control portion 50 of the present embodiment. For the temperature control by the control portion 50, as shown in FIG. 6, a control method of a multiple loop structure (also called cascade control) is used. As shown in FIG. 6, the target temperature calculation portion 56 calculates the medium target temperature based on the metallic mold temperatures (the temperatures detected by the temperature sensors 61) and the metallic mold target temperature. The medium temperature control portion 57 performs heating of the medium by the heaters 14 and 24 and cooling of the medium by opening the feeding and cooling electromagnetic valves 15 and 25 based on the medium target temperature calculated by the target temperature calculation portion 56 and the medium temperature (return medium temperature detected by the temperature sensor 66). Specifically, the electromagnetic valve control portion 571 performs the opening and closing control of the feeding and cooling electromagnetic valves 15 and 25, and the heater control portion 572 controls on/off of the heaters 14 and 24. Thereby, the medium temperature changes according to the response characteristics of the medium, and when the medium temperature changes, the temperature of the metallic mold 60 changes according to the response characteristics of the metallic mold 60.

In the present embodiment, since the first medium target temperature of the first medium is calculated based on the detection temperatures of the metallic mold 60 and the first metallic mold target temperature of the metallic mold 60 and the temperature of the first medium is made close to the calculated first medium target temperature like the above-described structure, for example, the first medium target temperature of the first medium can be changed one by one in consideration of the temperature response characteristics of the metallic mold 60. Thereby, without the occurrence of a transitional overshoot or undershoot, the temperature of the metallic mold 60 can be speedily made close to the first metallic mold target temperature and maintained at the first metallic mold target temperature.

Figure 7:
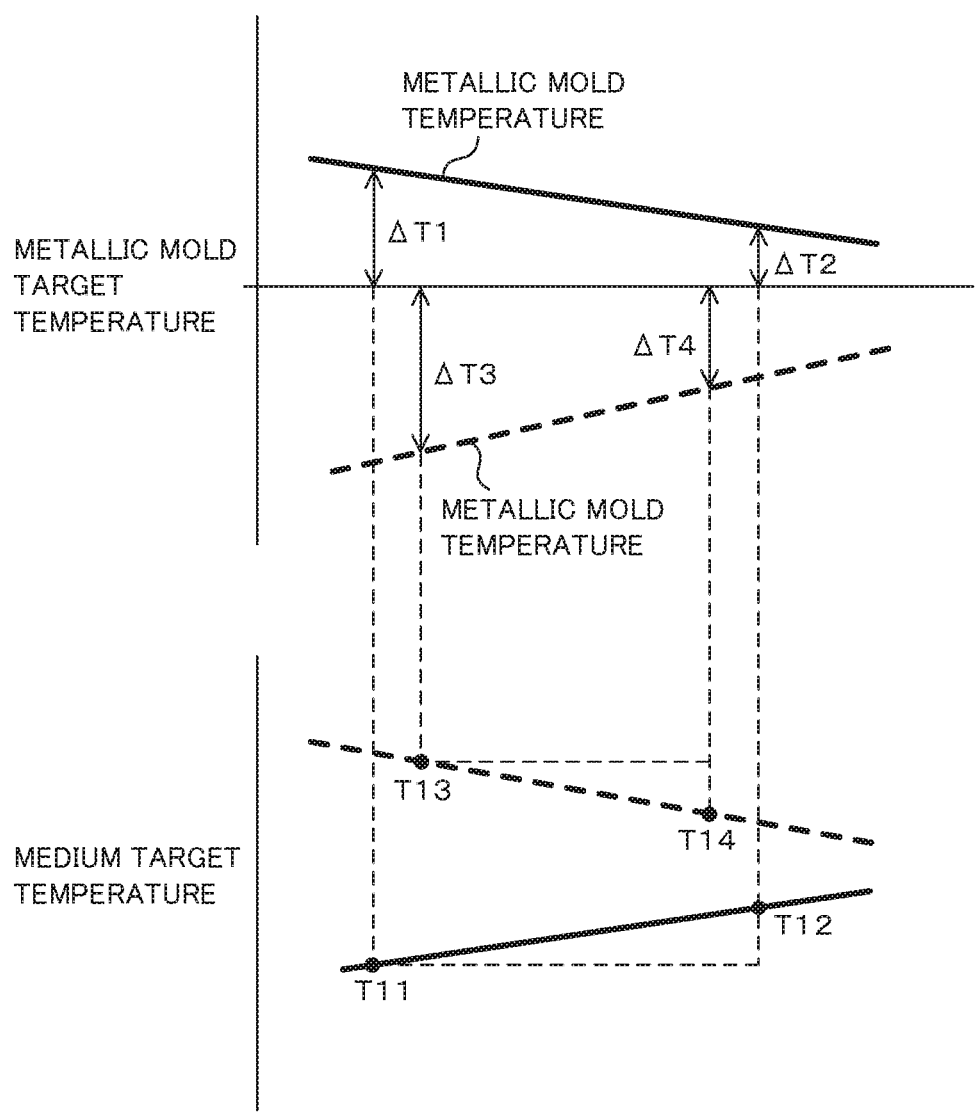
FIG. 7 is a schematic view showing an example of the calculation of the medium target temperature by a target temperature calculation portion.

FIG. 7 is a schematic view showing an example of the calculation of the medium target temperature by the target temperature calculation portion 56. In FIG. 7, the drawing in the upper part shows the temperature difference between the metallic mold temperature and the metallic mold target temperature, the solid line shows a case where the metallic mold temperature is higher than the metallic mold target temperature, and the broken line shows a case where the metallic mold temperature is lower than the metallic mold target temperature. The drawing in the lower part shows an example of calculation of the medium target temperature, the solid line shows the medium target temperature in a case where the metallic mold temperature is higher than the metallic mold target temperature, and the broken line shows the medium target temperature in a case where the metallic mold temperature is lower than the metallic mold target temperature.

The larger the temperature difference between the metallic mold temperature shown by the solid line and the metallic mold target temperature is, the lower medium target temperature the target temperature calculation portion 56 calculates, and the larger the temperature difference between the metallic mold target temperature and the metallic mold temperature shown by the broken line is, the higher medium target temperature the target temperature calculation portion 56 calculates. That is, when the temperature of the metallic mold is higher than the metallic mold target temperature, the larger the temperature difference between the temperature of the metallic mold and the metallic mold target temperature is, the lower medium target temperature the target temperature calculation portion 56 calculates, and when the temperature of the metallic mold is lower than the metallic mold target temperature, the larger the temperature difference between the metallic mold target temperature and the temperature of the metallic mold is, the higher medium target temperature the target temperature calculation portion 56 calculates.

As shown in FIG. 7, when the metallic mold temperature is higher than the metallic mold target temperature, the larger the absolute value of the temperature difference between the metallic mold temperature and the metallic mold target temperature is, the lower temperature the medium target temperature is made. For example, when the temperature difference between the metallic mold temperature and the metallic mold target temperature is $\Delta T1$, the medium target temperature is $T11$, and when the temperature difference between the metallic mold temperature and the metallic mold target temperature is $\Delta T2$ ($<\Delta T1$), the medium target temperature is $T12$ ($>T11$). Thereby, the temperature of the medium can be quickly decreased so that the temperature of the metallic mold 60 is speedily decreased to the metallic mold target temperature.

Moreover, when the metallic mold temperature is lower than the metallic mold target temperature, the larger the absolute value of the temperature difference between the metallic mold temperature and the metallic mold target temperature is, the higher temperature the medium target temperature is made. For example, when the temperature difference between the metallic mold temperature and the metallic mold target temperature is $\Delta T3$, the medium target temperature is $T13$, and when the temperature difference between the metallic mold temperature and the metallic mold target temperature is ΔT4 (<ΔT3), the medium target temperature is T14 (<T13). Thereby, the temperature of the medium can be quickly increased so that the temperature of the metallic mold 60 is speedily increased to the metallic mold target temperature. Thereby, the temperature of the metallic mold 60 can be speedily made to reach the target temperature.

Next, the temperature control when the medium supplied to the metallic mold 60 is switched will be described.

Figure 8:
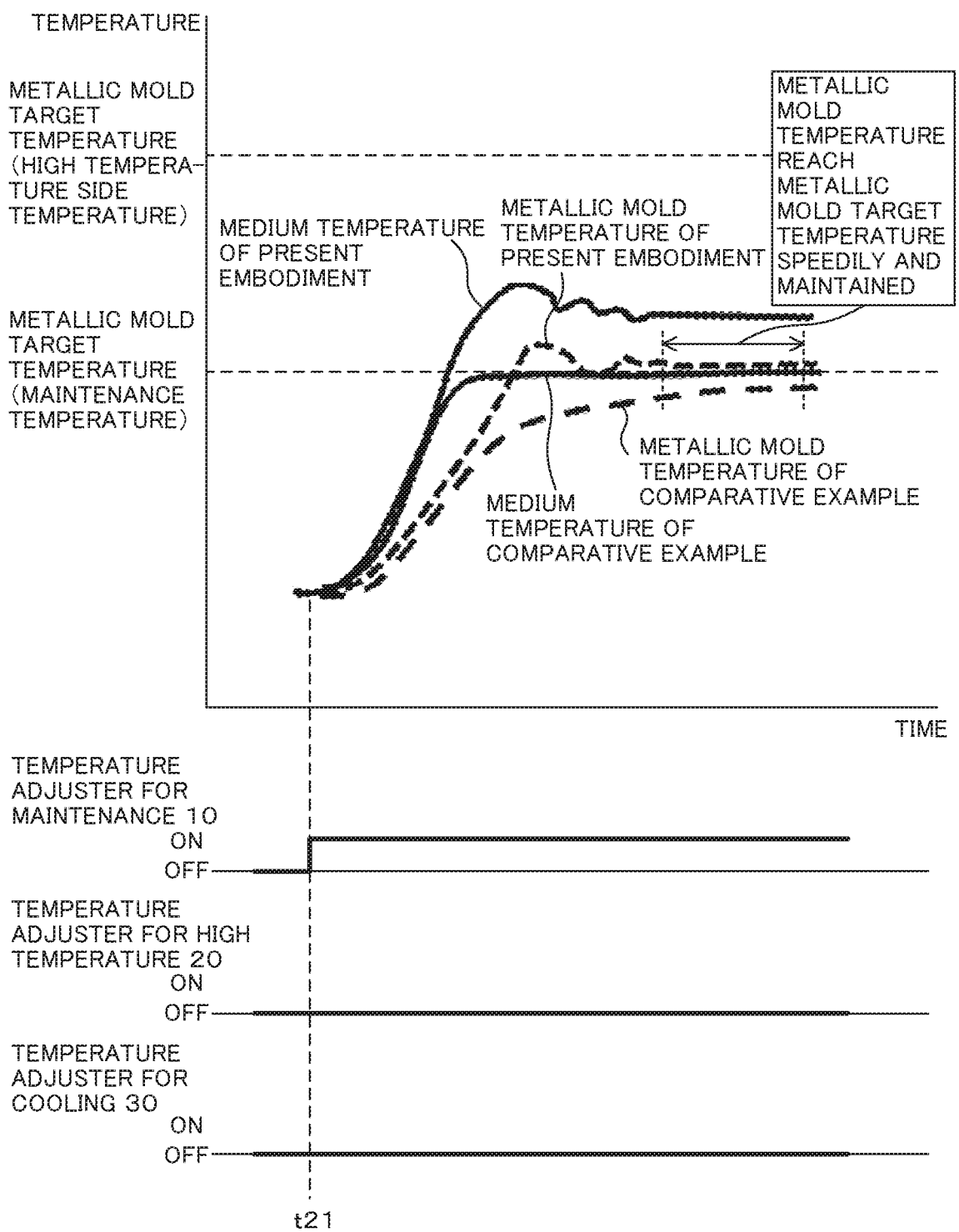
FIG. 8 is a schematic view showing an example of the manner of the temperature control when the temperature of the metallic mold is increased to a maintenance temperature.

FIG. 8 is a schematic view showing an example of the manner of the temperature control when the temperature of the metallic mold 60 is increased to the maintenance temperature. In the figure, the vertical axis represents the temperature, and the horizontal axis represents the time. FIG. 8 shows a case where the metallic mold 60 is increased from room temperature to the maintenance temperature (for example, 60 degrees C.). The solid line shows the shift of the medium temperature, and the broken line shows the shift of the metallic mold temperature. At time t21, the temperature adjuster 10 for maintenance is turned from off to on. The temperature adjuster 20 for high temperature and the temperature adjuster 30 for cooling are off. Here, on indicates a state in which the medium is circulated through the metallic mold 60 for supply, and off indicates a state in which the medium is not circulated through the metallic mold 60. Specifically, at time t21, the electromagnetic valves 41 and 42 are opened and the electromagnetic valve 43 is closed.

In the comparative example of FIG. 8, the control is performed by a method in which the medium temperature is controlled so as to become a set temperature and in the result, the temperature of the temperature-controlled metallic mold is made close to a desired temperature. For this reason, as shown in FIG. 8, a condition continues in which although the medium temperature becomes close to the metallic mold target temperature (maintenance temperature), the metallic mold temperature does not reach the metallic mold target temperature and a comparatively large temperature difference occurs between the metallic mold temperature and the metallic mold target temperature. That is, the relationship between the medium temperature and the metallic mold temperature is unclear, and although the medium temperature seems to be stable at a constant value, the metallic mold temperature has not reached the target temperature yet.

On the other hand, in the case of the present embodiment, since the medium temperature is cascade-controlled, the metallic mold temperature reaches the metallic mold target temperature speedily compared with the case of the comparative example, and the metallic mold temperature is maintained at the metallic mold target temperature and is stable. That is, in the present embodiment, the relationship between the medium temperature and the metallic mold temperature is clear, and when the medium temperature is stable at a constant value, the metallic mold temperature is also stable at substantially the same temperature.

When the temperature of the metallic mold 60 becomes within a predetermined range including the metallic mold target temperature, the medium temperature control portion 57 can store the temperature of the first medium (medium) detected by the temperature sensor 66 into the storage portion 55 as a first medium maintenance temperature (medium maintenance temperature). The medium temperature control portion 57 can control the temperature of the first medium so as to be maintained at the first medium maintenance temperature. Conventionally, it is only found what is the temperature of the metallic mold when the medium temperature is set to what value; however, by storing the first medium maintenance temperature, when the temperature of the medium is controlled, the temperature of the medium necessary for making the temperature of the metallic mold 60 a target temperature can be confirmed and recorded.

Moreover, when the first medium is circulated by the temperature adjuster 10 for maintenance through a metallic mold of a predetermined temperature (for example, room temperature), the medium temperature control portion 57 can control the temperature of the first medium to the first medium maintenance temperature. That is, in the temperature increasing process of increasing the temperature of the metallic mold 60 to the first metallic mold target temperature, it is found what temperature the target temperature of the medium is to be made, and an optimum temperature increasing process can be realized. Moreover, in the injection molding, in a case where the molten resin (liquid form) is injected into the metallic mold 60, when the temperature of the metallic mold 60 fluctuates, the viscosity of the molten resin fluctuates and there is a possibility that the quality of the molded items is deteriorated; however, in the present embodiment, since the metallic mold 60 can be maintained at a desired temperature, the viscosity of the molten resin does not fluctuate, so that the quality of the molded items can be prevented from deteriorating.

Figure 9:
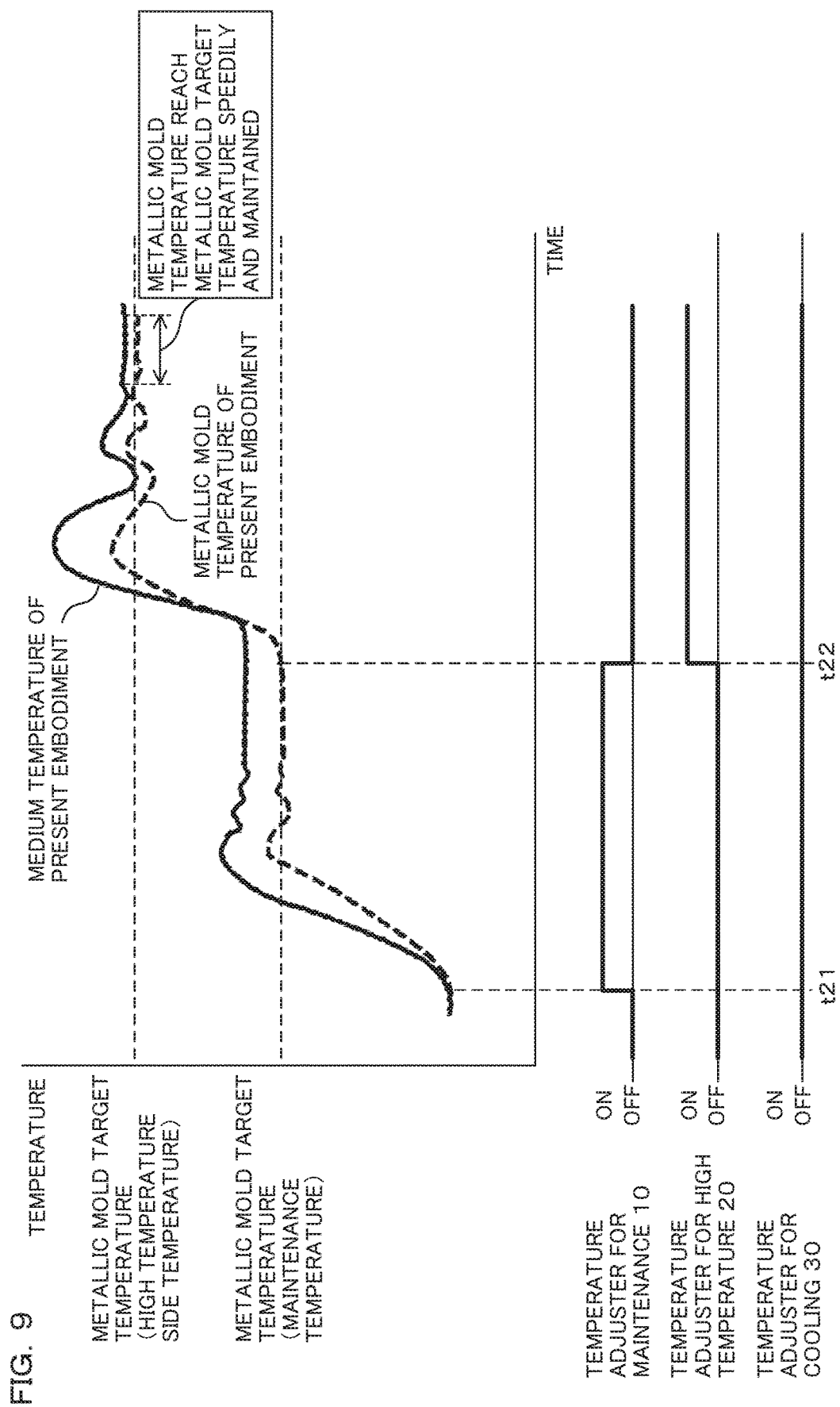
FIG. 9 is a schematic view showing an example of the manner of the temperature control when the temperature of the metallic mold is increased to a high temperature side temperature.

FIG. 9 is a schematic view showing an example of the manner of the temperature control when the temperature of the metallic mold 60 is increased to a high temperature side temperature. FIG. 9 shows a case where the metallic mold 60 is increased from the maintenance temperature to a high temperature side temperature (for example, 160 degrees C.). The solid line shows the shift of the medium temperature, and the broken line shows the shift of the metallic mold temperature. At time t22, the temperature adjuster 10 for maintenance is turned from on to off, and the temperature adjuster 20 for high temperature is turned from off to on. Specifically, at time t21, the electromagnetic valves 41 and 42 are closed, the electromagnetic valve 43 is opened, the electromagnetic valves 44 and 45 are opened, and the electromagnetic valve 46 is closed. When the temperature of the metallic mold 60 is increased to a high temperature side temperature, the control portion 50 can also use, for example, the control method illustrated in FIG. 6 and FIG. 7.

That is, the target temperature calculation portion 56 calculates the second medium target temperature of the second medium based on the temperatures of the metallic mold detected by the temperature sensors 61 (detection temperatures) and the second metallic mold target temperature of the metallic mold 60 when the second medium is circulated by the temperature adjuster 20 for high temperature.

The medium temperature control portion 57 controls the temperature of the second medium circulated by the temperature adjuster 20 for high temperature based on the temperature of the second medium detected by the temperature sensor 66 (return medium temperature) and the second medium target temperature.

Like the above-described structure, since the second medium target temperature of the second medium is calculated based on the detection temperatures of the metallic mold 60 and the second metallic mold target temperature of the metallic mold 60 and the temperature of the second medium is made close to the calculated second medium target temperature, for example, the second medium target temperature of the second medium can be changed one by one in consideration of the temperature response characteristics of the metallic mold 60. Thereby, without the occurrence of a transitional overshoot or undershoot, the temperature of the metallic mold 60 can be speedily made close to the second metallic mold target temperature and maintained at the second metallic mold target temperature.

As shown in FIG. 9, since the medium temperature is cascade-controlled, the metallic mold temperature speedily reaches the metallic mold target temperature, and the metallic mold temperature is maintained at the metallic mold target temperature and is stable. Moreover, in the present embodiment, the relationship between the medium temperature and the metallic mold temperature is clear, and when the medium temperature is stable at a constant value, the metallic mold temperature is also stable at substantially the same temperature.

The temperature adjuster 10 for maintenance can be on standby with the first medium being bypassed by the pipeline 18 while maintaining the temperature of the first medium at the first medium maintenance temperature stored in the storage portion 55.

Figure 10:
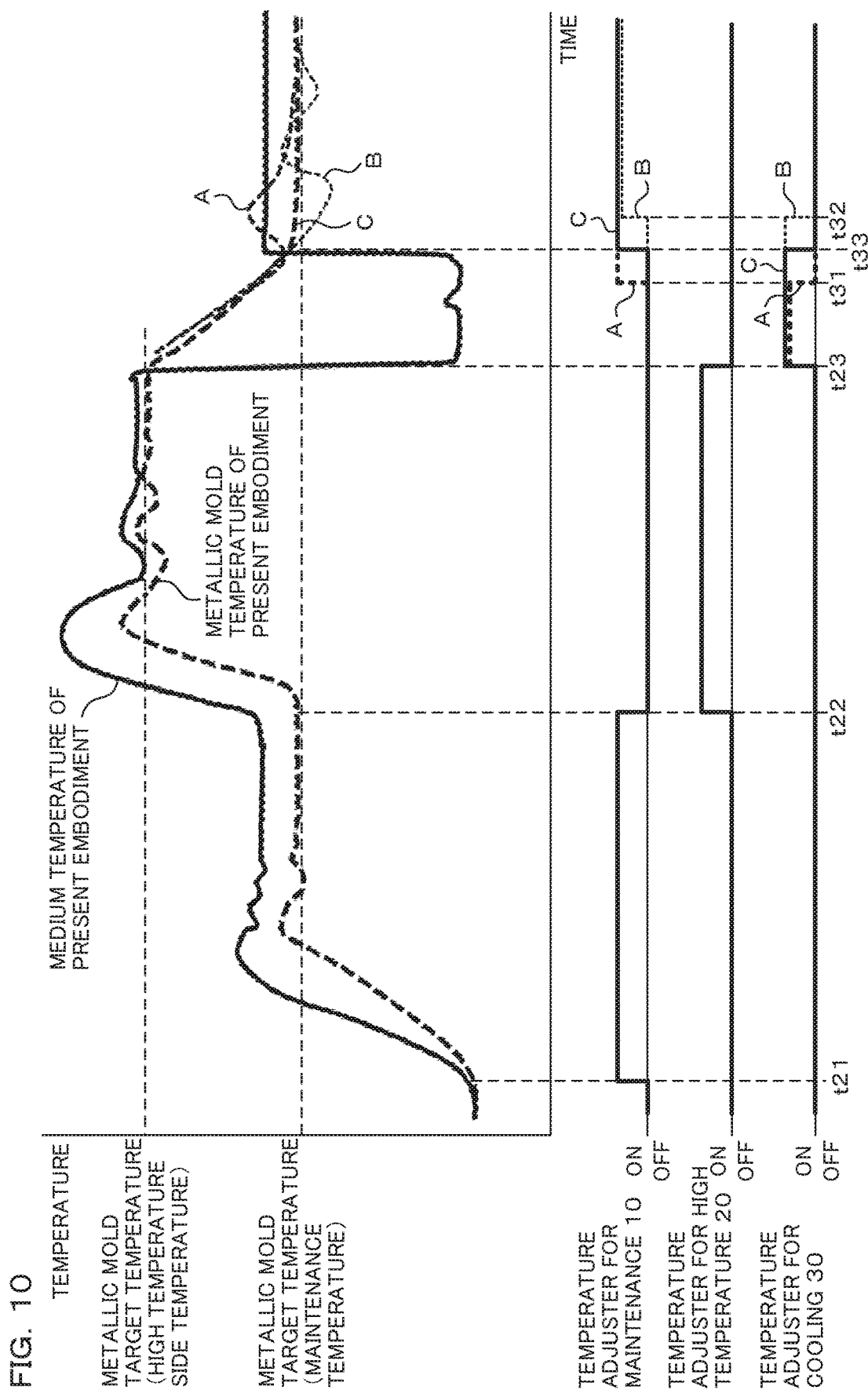
FIG. 10 is a schematic view showing an example of the manner of the temperature control when the temperature of the metallic mold is decreased to the maintenance temperature.

FIG. 10 is a schematic view showing an example of the manner of the temperature control when the temperature of the metallic mold 60 is decreased to the maintenance temperature. FIG. 10 shows a case where the metallic mold 60 is quickly cooled by use of the temperature adjuster 30 for cooling when it is decreased from a high temperature side temperature to the maintenance temperature. The solid line shows the shift of the medium temperature, and the broken line shows the shift of the metallic mold temperature. At time point t23, the temperature adjuster 20 for high temperature is turned from on to off, and the temperature adjuster 30 for cooling is turned from off to on. Specifically, at time t23, the electromagnetic valves 44 and 45 are closed, the electromagnetic valve 46 is opened, the electromagnetic valves 47 and 48 are opened, and the electromagnetic valve 49 is closed.

The valve controller 40 switches from the third medium to the first medium at the time point when a required time elapses from the switching time point of switching from the second medium to the third medium (in the example of FIG. 10, time point t23).

The switching time adjustment portion 58 has a function as an adjustment portion, and adjusts the required time. That is, by switching from the second medium of a high temperature (for example, 160 degrees C.) circulating through the metallic mold 60 to the third medium for cooling (for example, with a temperature of 40 degrees C.), the metallic mold 60 in high temperature state can be rapidly cooled.

The valve controller 40 can maintain the temperature of the metallic mold 60 at the first metallic mold target temperature by switching from the third medium for cooling circulating through the metallic mold 60 to the first medium for the maintenance temperature at the time point when the required time adjusted by the switching time adjustment portion 58 elapses. Thereby, without the occurrence of a transitional overshoot or undershoot, the temperature of the metallic mold 60 can be speedily made close to the first metallic mold target temperature and maintained at the first metallic mold target temperature.

Next, the required time adjustment method will be described.

In FIG. 10, it is assumed that at time point t31, switching is made from the temperature adjuster 30 for cooling to the temperature adjuster 10 for maintenance on the assumption that the temperatures detected by the temperature sensors 61 reach the first metallic mold target temperature or become close to the metallic mold target temperature. The switching time adjustment portion 58 stores the temperature of the metallic mold 60 at time point T31 (first temperature, for example, designated as T) into the storage portion 55. In this case, it is assumed that after time point T31, the peak (maximum temperature) of the temperatures detected by the temperature sensors 61 appears as shown at reference designation A. The peak of the temperature shown at reference designation A is represented as (T+ΔT). The switching time adjustment portion 58 stores the peak (T+ΔT) of the temperature of the metallic mold 60 into the storage portion 55.

By again switching from the second medium of a high temperature (for example, 160 degrees C.) circulating through the metallic mold 60 to the third medium for cooling (for example, with a temperature of 40 degrees C.) in the next cycle of the injection molding, the metallic mold 60 in high temperature state is rapidly cooled. In this case, the switching time adjustment portion 58 adjusts the required time based on the temperature T stored in the storage portion 55 and the peak (T+ΔT).

For example, it is assumed that the valve controller 40 switches from the third medium to the first medium for the maintenance temperature at time point t31 when the temperature of the metallic mold 60 in cooling state where the third medium for cooling is circulating becomes T (for example, 60 degrees C.). It is assumed that thereafter, the temperature of the metallic mold 60 becomes the maximum temperature (T+ΔT) (for example, 65 degrees C.). In this case, the switching time adjustment portion 58 adjusts the required time so that the next time point of switching from the third medium to the first medium is time point t33 when the temperature of the metal mode becomes (T−ΔT) (that is, 55 degrees C.). Thereby, as shown at reference designation C, without the occurrence of a transitional overshoot or undershoot, the temperature of the metallic mold 60 can be speedily made close to the first metallic mold target temperature and maintained at the first metallic mold target temperature.

Likewise, it is assumed that the valve controller 40 switches from the third medium to the first medium for the maintenance temperature at time point t32 when the temperature of the metallic mold 60 in cooling state where the third medium for cooling is circulating becomes T (for example, 60 degrees C.). It is assumed that thereafter, the temperature of the metallic mold 60 becomes the minimum temperature (T—ΔT) (for example, 55 degrees C.) as shown at reference designation B. In this case, the switching time adjustment portion 58 adjusts the required time so that the next time point of switching from the third medium to the first medium is time point t33 when the temperature of the metal mode becomes (T+ΔT) (that is, 65 degrees C.). Thereby, as shown at reference designation C, without the occurrence of a transitional overshoot or undershoot, the temperature of the metallic mold 60 can be speedily made close to the first metallic mold target temperature and maintained at the first metallic mold target temperature.

Figure 11:
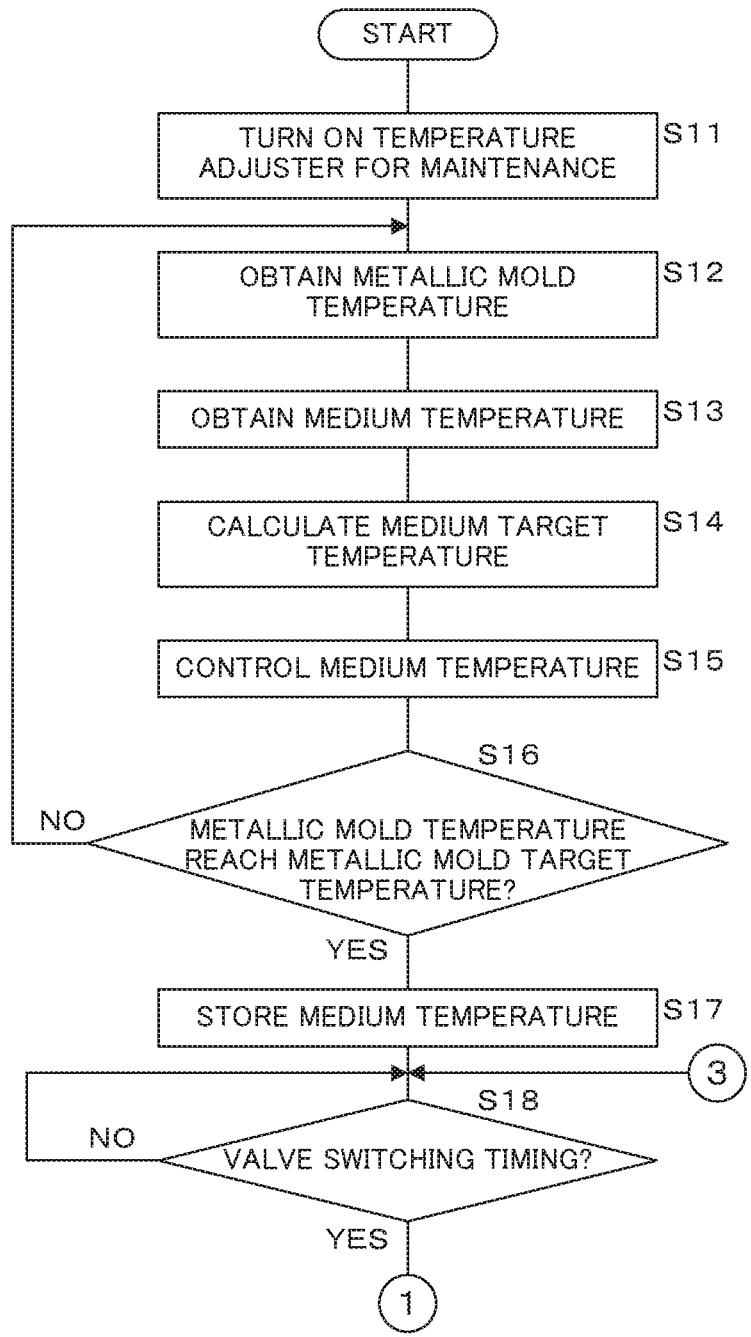
FIG. 11 is a flowchart showing an example of the processing procedure of the temperature control by the temperature control device of the present embodiment.
Figure 12:
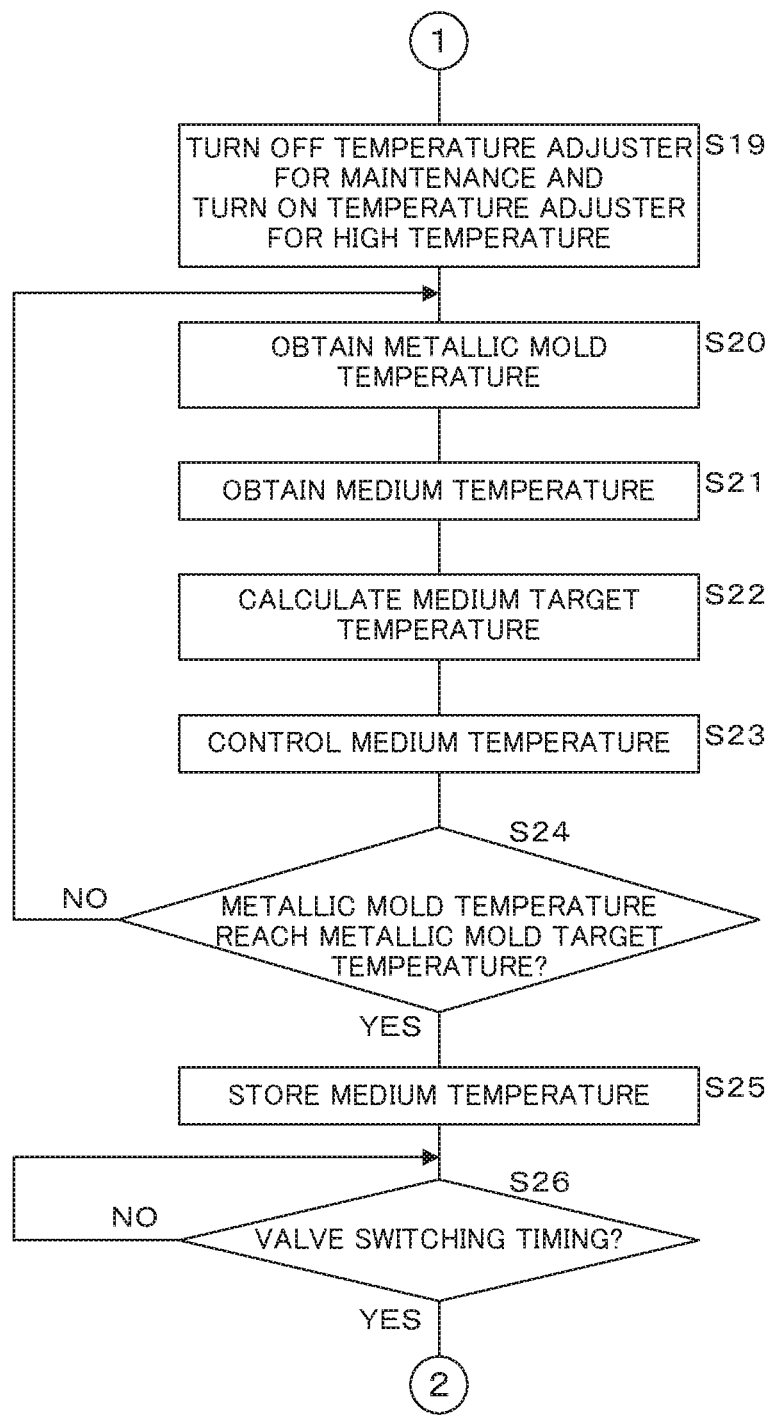
FIG. 12 is a flowchart showing an example of the processing procedure of the temperature control by the temperature control device of the present embodiment.
Figure 13:
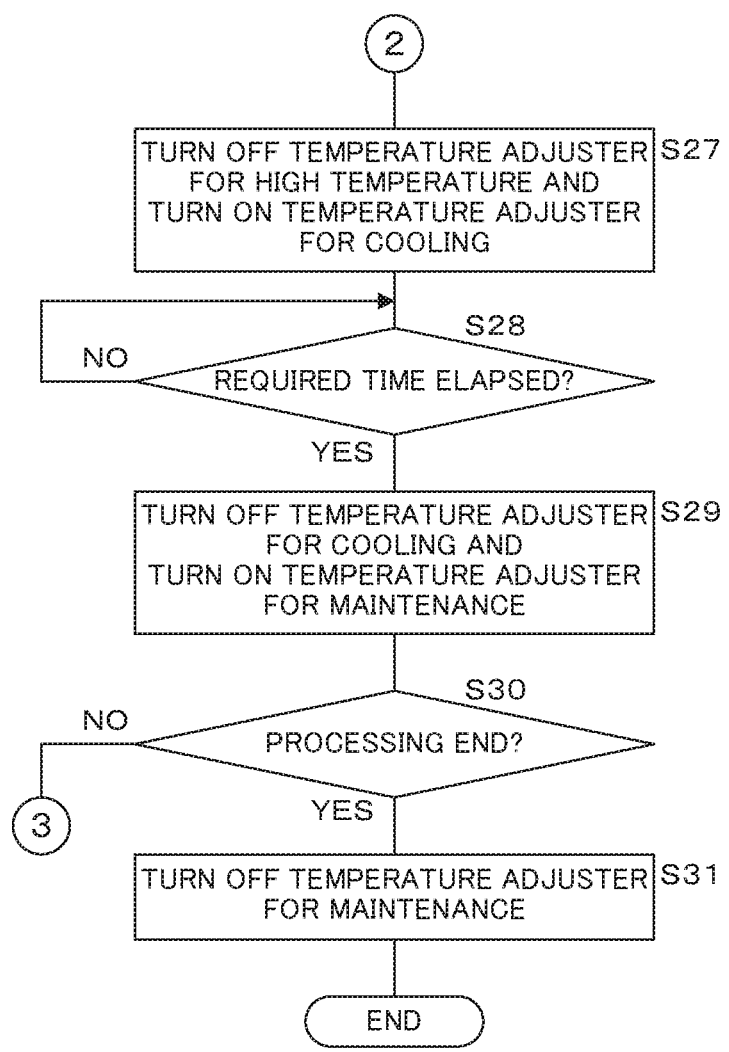
FIG. 13 is a flowchart showing an example of the processing procedure of the temperature control by the temperature control device of the present embodiment.

FIG. 11, FIG. 12 and FIG. 13 are flowcharts showing an example of the processing procedure of the temperature control by the temperature control device of the present embodiment. In the following, for the sake of convenience, description will be given with the control portion 50 as the main performer of the processing. The control portion 50 turns on the temperature adjuster 10 for maintenance (S11), obtains the temperature of the metallic mold 60 (S12), and obtains the temperature of the medium (S13). The control portion 50 calculates the medium target temperature (S14), and performs medium temperature control (S15).

The control portion 50 determines whether the temperature of the metallic mold 60 has reached the target temperature or not (S16), and when the temperature of the metallic mold 60 has not reached the target temperature (NO at S16), continues the processing at step S12 and succeeding steps. When the temperature of the metallic mold 60 has reached the target temperature (YES at S16), the control portion 50 stores the temperature of the medium (S17).

The control portion 50 determines whether it is the timing of valve switching or not (S18), and when it is not the timing of valve switching (NO at S18), continues the processing at step S18. When it is the timing of valve switching (YES at S18), the control portion 50 turns off the temperature adjuster 10 for maintenance and turns on the temperature adjuster 20 for high temperature (S19).

The control portion 50 obtains the temperature of the metallic mold 60 (S20), and obtains the temperature of the medium (S21). The control portion 50 calculates the medium target temperature (S22), and performs medium temperature control (S23).

The control portion 50 determines whether the temperature of the metallic mold 60 has reached the target temperature or not (S24), and when the temperature of the metallic mold 60 has not reached the target temperature (NO at S24), continues the processing at S20 and succeeding steps. When the temperature of the metallic mold 60 has reached the target temperature (YES at S24), the control portion 50 stores the temperature of the medium (S25).

The control portion 50 determines whether it is the timing of valve switching or not (S26), and when it is not the timing of valve switching (NO at S26), continues the processing at step S26. When it is the timing of valve switching (YES at S26), the control portion 50 turns off the temperature adjuster 20 for high temperature and turns on the temperature adjuster 30 for cooling (S27).

The control portion 50 determines whether the required time has elapsed or not (S28), and when the required time has not elapsed (NO at S28), continues the processing at step S28. When the required time has elapsed (YES at S28), the control portion 50 turns off the temperature adjuster 30 for cooling and turns on the temperature adjuster 10 for maintenance (S29).

The control portion 50 determines whether to end the processing or not (S30), and when the processing is not ended (NO at S30), continues the processing at step S18 and succeeding steps. When the processing is ended (YES at S30), the control portion 50 turns off the temperature adjuster 10 for maintenance (S31), and ends the processing.

The control portion 50 of the present embodiment may be implemented by using a computer provided with a CPU (processor), a ROM and a RAM (memory) and the like. For example, a computer program recorded on a recording medium (for example, an optically readable disk storage medium such as a CD-ROM) can be read by a recording medium reading portion (not shown) and stored in the RAM. The computer program may be stored on a hard disk (not shown) and stored into the RAM when it is executed. By loading a computer program that determines the procedures of each processing as shown in FIG. 11 to FIG. 13 to the RAM (memory) provided on the computer and executing the computer program by the CPU (processor), the control portion 50 can be implemented on the computer.

While the temperature adjuster 30 for cooling is provided with the heat exchanger 34 in the above-described embodiment, the present invention is not limited thereto; it may be provided with a heater like the temperature adjuster 10 for maintenance and the temperature adjuster 20 for high temperature. Moreover, while three temperature adjusters are used in the present embodiment, four temperature adjusters may be provided. Thereby, rapid heating and rapid cooling of the metallic mold can be further enabled.

A temperature control device according to the present disclosure is a temperature control device that controls a temperature of a medium circulated through an object via a pipeline and is provided with: a first medium circulating portion that circulates the medium via a first pipeline; a second medium circulating portion that circulates the medium via a second pipeline; a third medium circulating portion that circulates the medium via a third pipeline; a switching portion that switches the medium circulated through the object by selecting any one of the first pipeline, the second pipeline and the third pipeline; and a pressure supply portion that supplies a required pressure through a pressure pipe communicating with each of the first pipeline, the second pipeline and the third pipeline.

The first medium circulating portion circulates the medium through the object via the first pipeline. The second medium circulating portion circulates the medium through the object via the second pipeline. The third medium circulating portion circulates the medium through the object via the third pipeline. The object includes, for example, a metallic mold. The medium circulating portions each have, for example, a pump, a heater or a heat exchanger, a cooling electromagnetic valve and the like. Moreover, the medium circulating portions are capable of circulating media of different temperatures, respectively. For example, the first medium circulating portion is capable of circulating the medium for maintaining the temperature of the metallic mold in the injection process, the second medium circulating portion is capable of circulating the medium for making the temperature of the metallic mold high in order to solidify the injected resin (for example, a thermoset resin), and the third medium circulating portion is capable of circulating the medium for speedily cooling the metallic mold that is high in temperature.

The switching portion selects any one of the first pipeline, the second pipeline and the third pipeline to switch the medium circulated through the object. For example, a state in which the medium is circulated by the first medium circulating portion (metallic mold temperature maintaining state), a state in which the medium is circulated by the second medium circulating portion (metallic mold temperature high temperature state), a state in which the medium is circulated by the third medium circulating portion (metallic mold temperature cooling state), and a state in which the medium is circulated by the first medium circulating portion (metallic mold temperature maintaining state) can be repeated in this order.

Thereby, when the temperature of the metallic mold is returned from a high temperature to a maintenance temperature, by temporarily switching to the third medium circulating portion, the temperature of the metallic mold can be speedily cooled, so that the temperature of the metallic mold can be made to speedily reach a target temperature (maintenance temperature).

The pressure supply portion supplies the required pressure through the pressure pipe communicating with each of the first pipeline, the second pipeline and the third pipeline. That is, from one pressure supply portion, the required pressure can be applied to each of the first pipeline, the second pipeline and the third pipeline through the three pressure pipes. The pressure supply portion is, for example, a pressurization pump.

Thereby, for example, even when the temperature of the medium (for example, water) circulating through any of the first pipeline, the second pipeline and the third pipeline increases and the medium boils unless pressurized to a pressure not less than the saturated water vapor pressure of the medium, the required pressure (pressure not less than the saturated water vapor pressure) can be applied by the pressure supply portion, so that the medium can be prevented from boiling.

If a pressurization pump is provided on each of the first pipeline, the second pipeline and the third pipeline, the pressures applied to the first pipeline, the second pipeline and the third pipeline are different because of the difference among the pressure settings of the pressurization pumps and the individual difference, so that a pressure difference and pressure fluctuations occur in the pipelines when the medium circulating portion is switched. For this reason, the medium can instantaneously boil at the time of switching of the medium circulating portion and there is a possibility that scale adheres to the heater of the medium circulating portion or the pump of the medium circulating portion breaks. In the present embodiment, since the required pressure is applied to the first pipeline, the second pipeline and the third pipeline through the three pressure pipes from one pressure supply portion, the pressure can be stabilized without the occurrence of a pressure difference or pressure fluctuations in the pipelines at the time of switching of the medium circulating portion. Moreover, there is no possibility that the medium instantaneously boils at the time of switching of the medium circulating portion, the adhesion of scale to the heaters never occurs, and no breakage of the pumps occurs.

The temperature control device according to the present disclosure is provided with a pressure control portion that controls the pressure supplied by the pressure supply portion, and the pressure control portion controls the pressure so as to be not less than a saturated water vapor pressure corresponding to the highest one of temperatures at which the media circulating through the first pipeline, the second pipeline and the third pipeline come to a boil.

The pressure control portion controls the pressure supplied by the pressure supply portion. The pressure control portion controls the pressure so as to be not less than the saturated water vapor pressure corresponding to the highest one of the temperatures at which the media circulating through the first pipeline, the second pipeline and the third pipeline come to a boil. Thereby, whatever the temperatures of the media circulated by the first medium circulating portion, the second medium circulating portion and the third medium circulating portion are, the media can be prevented from boiling.

The temperature control device according to the present disclosure is provided with a temperature detection portion that detects the temperatures of the media circulating through the first pipeline, the second pipeline and the third pipeline, and the pressure control portion controls the pressure so as to be not less than a saturated water vapor pressure corresponding to the highest one of temperatures of the media detected by the temperature detection portion.

The temperature detection portion detects the temperatures of the media circulating through the first pipeline, the second pipeline and the third pipeline. The pressure control portion controls the pressure so as to be not less than the saturated water vapor pressure corresponding to the highest one of the temperatures of the media detected by the temperature detection portion. Thereby, whatever the temperatures of the media circulated by the first medium circulating portion, the second medium circulating portion and the third medium circulating portion are, the media can be prevented from boiling.

The temperature control device according to the present disclosure is provided with a calculation portion that repetitively calculates the highest saturated water vapor pressure of the saturated water vapor pressures of the media based on the temperatures of the media repetitively detected by the temperature detection portion, and the pressure control portion controls the pressure so as to be not less than the highest saturated water vapor pressure in response to a shift of the highest saturated water vapor pressure calculated by the calculation portion.

The calculation portion repetitively calculates the highest one of the saturated water vapor pressures of the media based on the temperatures of the media repetitively detected by the temperature detection portion. In this case, the saturated water vapor pressure corresponding to the highest one of the temperatures detected by the temperature detection portion may be calculated, or the highest one of the saturated water vapor pressures corresponding to the temperatures detected by the temperature detection portion may be calculated.

The pressure control portion controls the pressure so as to be not less than the highest saturated water vapor pressure in response to the shift of the highest saturated water vapor pressure calculated by the calculation portion. By changing the highest saturated water vapor pressure according to the temperature of the medium, for example, the applied pressure can be changed according to the highest saturated water vapor pressure without the need to always apply a pressure not less than a preset constant highest saturated water vapor pressure, so that the safety of the device can be enhanced without the need to apply more pressure than is necessary.

In the temperature control device according to the present disclosure, the first medium circulating portion circulates the medium of a first temperature when a molten resin is injected into a metallic mold as the object, the second medium circulating portion circulates the medium of a second temperature higher than the first temperature when the molten resin in the metallic mold is thermally hardened, and the third medium circulating portion circulates the medium of a third temperature lower than the first temperature.

The first medium circulating portion circulates the medium of the first temperature when the molten resin is injected into the metallic mold, the second medium circulating portion circulates the medium of the second temperature higher than the first temperature when the molten resin in the metallic mold is thermally hardened, and the third medium circulating portion circulates the medium of the third temperature lower than the first temperature.

Thereby, when the temperature of the metallic mold is returned from a high temperature (the second temperature) to a maintenance temperature (the first temperature), by temporarily switching to the third medium circulating portion, the temperature of the metallic mold can be speedily cooled, so that the temperature of the metallic mold can be made to speedily reach the target temperature (maintenance temperature).

In the temperature control device according to the present disclosure, the pressure supply portion is a pressurization pump, an inlet side of the pressurization pump communicates with a water feeding inlet, an outlet side of the pressurization pump is connected to a bypass pipe communicating with the pressure pipe and a water discharging outlet, and an on-off valve is provided that is interposed in a middle of the bypass pipe.

The pressure supply portion is a pressurization pump. The inlet side of the pressurization pump communicates with the water feeding inlet, the outlet side of the pressurization pump is connected to the bypass pipe communicating with the pressure pipe and the water discharging outlet, and the on-off valve is provided that is interposed in the middle of the bypass pipe.

Thereby, when the pressures of the first pipeline, the second pipeline and the third pipeline are decreased, by opening the on-off valve without stopping the pressurization pump, the pressures can be decreased through the bypass pipe. Moreover, since water can be circulated, the temperature rise of the pressure pipe can be prevented.

At least part of the above-described embodiment may be arbitrarily combined.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A temperature control device that controls a temperature of a medium circulated through an object via a pipeline, the device comprising:
   a first medium circulating portion that circulates the medium via a first pipeline;
   a second medium circulating portion that circulates the medium via a second pipeline;
   a third medium circulating portion that circulates the medium via a third pipeline;
   a switching portion that switches the medium circulated through the object by selecting any one of the first pipeline, the second pipeline and the third pipeline;
   a single pressurization pump that can apply a required pressure to the first pipeline, the second pipeline, and the third pipeline through a pressure pipe communicating with each of the first pipeline, the second pipeline and the third pipeline, wherein the pressurization pump communicates with the pressure pipe, and
   the pressure pipe branches into three branched pressure pipes that communicate directly with the first pipeline, the second pipeline and the third pipeline, respectively.

2. The temperature control device according to claim 1, further comprising:
   a pressure control portion that controls the pressure applied by the pressurization pump, wherein the pressure control portion controls the pressure so as to be not less than a saturated water vapor pressure corresponding to the highest one of temperatures at which the media circulating through the first pipeline, the second pipeline and the third pipeline come to a boil.

3. The temperature control device according to claim 2, wherein a temperature detection portion is provided that detects the temperatures of the media circulating through the first pipeline, the second pipeline and the third pipeline, and
   the pressure control portion controls the pressure so as to be not less than a saturated water vapor pressure corresponding to the highest one of temperatures of the media detected by the temperature detection portion.

4. The temperature control device according to claim 3, wherein a calculation portion is provided that repetitively calculates the highest saturated water vapor pressure of saturated water vapor pressures of the media based on the temperatures of the media repetitively detected by the temperature detection portion, and
   the pressure control portion controls the pressure so as to be not less than the highest saturated water vapor pressure in response to a shift of the highest saturated water vapor pressure calculated by the calculation portion.

5. The temperature control device according to claim 4, wherein the first medium circulating portion circulates the medium of a first temperature when a molten resin is injected into a metallic mold as the object,
   the second medium circulating portion circulates the medium of a second temperature higher than the first temperature when the molten resin in the metallic mold is thermally hardened, and
   the third medium circulating portion circulates the medium of a third temperature lower than the first temperature.

6. The temperature control device according to claim 5, wherein an inlet side of the pressurization pump communicates with a water feeding inlet,
   an outlet side of the pressurization pump is connected to a bypass pipe communicating with the pressure pipe and a water discharging outlet, and
   an on-off valve is provided that is interposed in a middle of the bypass pipe.

* * * * *